US011868169B2

(12) United States Patent
Taratine

(10) Patent No.: US 11,868,169 B2
(45) Date of Patent: *Jan. 9, 2024

(54) ENABLING ACCESS TO DATA

(71) Applicant: Visa Europe Limited, London (GB)

(72) Inventor: Boris Taratine, London (GB)

(73) Assignee: Visa Europe Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,239

(22) Filed: Feb. 3, 2022

(65) Prior Publication Data

US 2022/0155127 A1    May 19, 2022

Related U.S. Application Data

(63) Continuation of application No. 16/575,795, filed on Sep. 19, 2019, now Pat. No. 11,275,821, which is a
(Continued)

(30) Foreign Application Priority Data

Jun. 21, 2013 (GB) ........................ 1311120

(51) Int. Cl.
*H04L 29/06* (2006.01)
*G06F 21/35* (2013.01)
(Continued)

(52) U.S. Cl.
CPC .............. *G06F 21/35* (2013.01); *G01F 23/18* (2013.01); *G06F 21/43* (2013.01); *G06F 21/725* (2013.01);
(Continued)

(58) Field of Classification Search
CPC ........ G06F 21/35; G06F 21/725; G06F 21/43; G06F 2221/2113; H04W 4/80;
(Continued)

(56) References Cited

U.S. PATENT DOCUMENTS 8,112,066 B2  2/2012 Ben Ayed
8,396,452 B1  3/2013 Matsuoka
(Continued)

FOREIGN PATENT DOCUMENTS

CN    1378667    11/2002
CN    1614924    5/2005
(Continued)

OTHER PUBLICATIONS

Mathur et al., "ProxiMate: proximity-based secure pairing using ambient wireless signals", MobiSys '11: Proceedings of the 9th international conference on Mobile systems, applications, and services, Jun. 2011.*
(Continued)

*Primary Examiner* — Morshed Mehedi
(74) *Attorney, Agent, or Firm* — Kilpatrick Townsend Stockton LLP

(57) ABSTRACT

Systems, methods and apparatus for enabling access to secure data. A first module is arranged to generate a limited use passcode and make the passcode available to a user. A second module and a third module are arranged to communicate whereby to enable detection of the third module being in proximity to the second module. A fourth module is arranged to receive a passcode via user input. The apparatus is arranged to enable access to secure data in dependence on the fourth module receiving a valid passcode generated by the first module and the third module being in proximity to the second module.

12 Claims, 5 Drawing Sheets

Related U.S. Application Data continuation of application No. 14/977,400, filed on Dec. 21, 2015, now Pat. No. 10,445,484, which is a continuation of application No. PCT/GB2014/051905, filed on Jun. 20, 2014.

(51) Int. Cl.

| | | |
|---|---|---|
| *H04W 4/80* | (2018.01) | |
| *H04W 12/04* | (2021.01) | |
| *H04W 12/08* | (2021.01) | |
| *G06F 21/43* | (2013.01) | |
| *G06F 21/72* | (2013.01) | |
| *H04L 9/40* | (2022.01) | |
| *H04L 9/32* | (2006.01) | |
| *H04L 9/12* | (2006.01) | |
| *G01F 23/18* | (2006.01) | |
| *H04W 12/63* | (2021.01) | |

(52) U.S. Cl.
CPC .............. *H04L 9/12* (2013.01); *H04L 9/3228* (2013.01); *H04L 63/0838* (2013.01); *H04L 63/107* (2013.01); *H04W 4/80* (2018.02); *H04W 12/04* (2013.01); *H04W 12/08* (2013.01); *G06F 2221/2113* (2013.01); *H04L 63/18* (2013.01); *H04L 2209/805* (2013.01); *H04W 12/63* (2021.01)

(58) Field of Classification Search
CPC ........ H04W 12/08; H04W 12/04; H04L 9/12; H04L 9/3228; H04L 63/107; H04L 63/0838; H04L 2209/805; H04L 63/18
See application file for complete search history.

(56) References Cited

U.S. PATENT DOCUMENTS

| | | | |
|---|---|---|---|
| 8,955,083 B2 | 2/2015 | Ettorre et al. | |
| 10,445,484 B2 | 10/2019 | Taratine | |
| 2003/0050009 A1 | 3/2003 | Kurisko et al. | |
| 2004/0203592 A1* | 10/2004 | Kermode | H04K 1/00 |
| | | | 455/575.1 |
| 2005/0015588 A1* | 1/2005 | Lin | G06Q 20/385 |
| | | | 713/159 |
| 2008/0307237 A1 | 12/2008 | Holtzman et al. | |
| 2009/0158049 A1 | 6/2009 | Fiske | |
| 2009/0222910 A1 | 9/2009 | Le Bihan et al. | |
| 2011/0078773 A1 | 3/2011 | Bhasin et al. | |
| 2011/0138192 A1 | 6/2011 | Kocher et al. | |
| 2011/0314539 A1 | 12/2011 | Horton | |
| 2012/0015629 A1* | 1/2012 | Olsen | H04L 63/083 |
| | | | 455/411 |
| 2012/0233684 A1 | 9/2012 | Denis et al. | |
| 2012/0266221 A1 | 10/2012 | Castelluccia et al. | |
| 2013/0268767 A1 | 10/2013 | Schrecker | |
| 2013/0268768 A1* | 10/2013 | Corlett | G06F 21/34 |
| | | | 713/185 |
| 2013/0318575 A1 | 11/2013 | Hart et al. | |

FOREIGN PATENT DOCUMENTS

| | | |
|---|---|---|
| CN | 101014958 | 8/2007 |
| CN | 102117387 | 7/2011 |
| GB | 2495704 | 4/2013 |
| WO | 9807249 | 2/1998 |
| WO | 0048064 | 8/2000 |
| WO | 2006069082 | 6/2006 |
| WO | 2010136830 | 12/2010 |
| WO | 2014011571 | 1/2014 |
| WO | 2014203004 | 12/2014 |

OTHER PUBLICATIONS

"Single Trip RFID Tags", RFID Solutions, The Kennedy Group, Available Online at: http://www.kennedygrp.com/single-trip-rfid-solutions, Oct. 14, 2011, 2 pages.
U.S. Appl. No. 14/977,400 , Final Office Action, dated Jun. 14, 2018, 24 pages.
U.S. Appl. No. 14/977,400 , Non-Final Office Action, dated Jan. 28, 2019, 15 pages.
U.S. Appl. No. 14/977,400 , Non-Final Office Action, dated Sep. 27, 2017, 24 pages.
U.S. Appl. No. 14/977,400 , Notice of Allowance, dated May 22, 2019, 11 pages.
U.S. Appl. No. 16/575,795 , Non-Final Office Action, dated Jul. 13, 2021, 16 pages.
U.S. Appl. No. 16/575,795 , Notice of Allowance, dated Nov. 5, 2021, 10 pages.
Application No. CN201480041271.X, Office Action, dated Mar. 14, 2018, 27 pages.
Decker et al., "Proximity as a Security Property in a Mobile Enterprise Application Context", 37th Annual Hawaii International Conference on System Sciences, Jan. 2004, pp. 1-10.
Application No. PCT/GB2014/051905 , International Search Report and Written Opinion, dated Dec. 16, 2014, 13 pages.
Sandhu et al., "Secure Information sharing Enabled by Trusted Computing and PEI Models", ASIACCS '06: Proceedings of the 2006 ACM Symposium on Information, computer and communications security, 2006, pp. 2-12.
Chinese Office Action dated Jul. 18, 2022 for CN Patent Application No. 20148004127X, with English Translation, 12 pages.

* cited by examiner

ENABLING ACCESS TO DATA

CROSS-REFERENCE TO RELATED APPLICATIONS

This application is a continuation of U.S. application Ser. No. 16/575,795 filed Sep. 19, 2019, which is a continuation of U.S. application Ser. No. 14/977,400, filed Dec. 21, 2015, which is a continuation of International Application No. PCT/GB2014/051905, filed Jun. 20, 2014, which claims the benefit of GB Application No. GB 1311120.8, filed Jun. 21, 2013. Each of the above referenced patent applications is incorporated by reference in their entirety.

BACKGROUND OF THE INVENTION

Field of the Invention

A system for enabling access to data, and in particular a system for enabling access to data stored on, or accessible using, a user device.

Description of the Related Technology

User devices, such as mobile telephones, tablet computers, laptop computers and desktop computers are increasingly being used to provide access to secure data. Such devices may be provided with a secure element, for example a Subscriber Identity Module (SIM) in a cellular device (i.e. telephone or tablet), or a Trusted Platform Module (TPM) in a computing device. The secure element is tamper resistant and may store secure data (which may itself comprise credentials enabling access to further secure data). In such cases, it is important to ensure that access to the secure data is adequately controlled to prevent unauthorized users attacking the system and gaining access.

Many security features have been proposed in relation to mobile devices. One proposed method is to use a proximity system to control access to the secure data, such as the system described in granted U.S. Pat. No. 8,112,066. Here, a mobile telephone is paired with a Bluetooth™ device. When the mobile telephone and the Bluetooth™ device are in proximity, the secure data is accessible. This thus provides security in a relatively convenient manner to the user.

It would be desirable to increase the security of data on a device, whilst maintaining relative convenience to the user.

SUMMARY

In accordance with at least one embodiment, methods, devices, systems and software are provided for supporting or implementing functionality to transmit credentials.

This is achieved by a combination of features recited in each independent claim. Accordingly, dependent claims prescribe further detailed implementations of various embodiments.

According to a first aspect of the invention, there is provided apparatus for enabling access to secure data, the apparatus comprising: a first module arranged to generate a limited use passcode and make the passcode available to a user; a second module and a third module arranged to communicate whereby to enable detection of the third module being in proximity to the second module; and a fourth module arranged to receive a passcode via user input; wherein the apparatus is arranged to enable access to secure data in dependence on the fourth module receiving a valid passcode generated by the first module and the third module being in proximity to the second module.

In addition to using a proximity system to prevent access to the secure data in case of theft, a limited use passcode system is also used to enable access to the secure data. Since the limited use passcode is provided as user input, the receipt by the fourth module of a valid limited use passcode indicates that a local user is present. This in turn indicates that the device is not being controlled by an unauthorized remote user (who would be unable to receive the passcode and provide it as user input). Consequently, by providing the apparatus as described above, embodiments are able to enable access to secure data based on two security functions, the first determining whether an authorized user is in proximity, and the second determining that the user is a local to the apparatus. This increases the security with which access to the data is enabled.

The passcode is limited use in that there is a limit on its validity. For example, the passcode may only be used once (after which becomes invalid). Alternatively or additionally, the passcode may be valid for a limited duration. One example of a limited use passcode is a "one-time passcode" or OTP. One advantage of using a generated, limited use, passcode is that the opportunities for replay attacks, where the passcode is stored and then used by an unauthorized party at a later time, are reduced. In another words, embodiments according to the above description, provide a passcode which is non-reusable and non-replicable.

Embodiments according to the above description, also provide advantages over a system which uses only a limited use passcode (without proximity). Such a system (using only a passcode) could not prevent unauthorized access to the secure data should the passcode generator device be stolen. It will be noted that due to the first module making the passcode available to a user so as to be transfer the passcode via user input, the passcode is prevented from being surreptitiously stolen via, e.g. the internet.

The apparatus may be arranged to make a seed value concurrently available to the first and fourth modules by transferring the seed value between the second and third modules. The first module may be arranged to use the seed value to generate the limited use passcode. The fourth module may be arranged to validate a received passcode using the seed value.

In systems where a limited use passcode is generated, a seed value may be used as an input for the passcode generation. This seed value changes, thereby ensuring that the passcode changes (and thus has limited use). For such a system to work, both passcode generator and the passcode validator (i.e. the first and fourth modules) need a given seed value to be concurrently available to them. Typically the seed value cannot be directly communicated between the first and fourth modules, since this could make the system vulnerable as both modules (being in communication) may be accessed by a remote user. Consequently, in many systems the seed value is time based; that is the seed value is, or is derived from, a value of current time.

If the seed value is time based, both the first and fourth modules require access to a trusted source of time. Here, a trusted source of time is one which can be relied upon to be unaltered. By way of example, time determined by a secure clock, internal or connected to the module, can be trusted, whereas time provided by a user input, or from a clock which may be altered, cannot be trusted. Relying on a source of time which can be altered may enable replay attacks, where the time available to one modules is altered. This may make the fourth module accept a passcode generated in the past, or make the first module generate a passcode which will be valid in the future.

In some situations, one or both of the first and fourth modules may not have access to a trusted source of time. This may be because, due to manufacturing considerations, the relevant module cannot be provided with an internal clock. To exemplify this, the relevant module may be a part of a Subscriber Identity Module (SIM) of a mobile telephone or a part of a smartcard (that is a card with a chip, such as a banking card or identity card). Such devices typically do not have internal clocks, and therefore may not have access to a trusted source of time.

Advantageously, by providing the modules as described above, the proximity detection modules (the second and third modules) can be provided with a secondary use—that of enabling that the seed value to be made concurrently available to both the first and fourth modules using a secure communications protocol. This means that there is no requirement for both first and fourth modules to have access to a trusted source of time. In some embodiments, there is no use for a time based seed value at all as one module may randomly generate a seed value, and the other may receive the same seed value via the second and third modules as described above. By removing the need for a clock, the apparatus may therefore be simplified.

The first module and the third module may comprise synchronized clocks. The seed value may be determined by the first and third modules using an indication of time from respective clocks. Alternatively, the first and third modules may be communicatively connected, and may be arranged cooperate whereby to generate and have the seed value concurrently available. The second and fourth modules may also be communicatively connected, and the second module may be arranged to provide the seed value received from the third module to the fourth module.

In the above, the first and third modules have access to the same seed value, either by being communicatively connected or having access to synchronized clocks. In the latter case, the first and third modules may be physically separated. The third module provides the seed value to the second module, which in turn makes the seed value available to the fourth module. Therefore, the fourth module is able to receive the seed value, without needing a clock synchronized with the first module.

The third and fourth modules may be communicatively connected, and may be arranged to cooperate whereby to generate and have the seed value concurrently available. The first and second modules may be communicatively connected, and the second module may be arranged to provide the seed value received from the third module to the first module. In this alternative embodiment, the third and fourth modules are connected, and between them generate the seed value. Therefore the seed value is available to the fourth module. The third module provides the seed value to the first module via the second module.

The third and fourth modules may be communicatively connected, and the fourth module may be arranged to provide data indicative of the passcode received via user input to the third module. The third module may be arranged to transfer data indicative of the passcode to the second module. The first and second modules may be communicatively connected. The apparatus may be arranged to determine whether the generated passcode made available to the user by the first module was received via user input at the fourth module. In this embodiment, the limited use passcode is returned and validated against the originally generated passcode using the proximity detecting modules. This therefore allows enabling of access using the two factors mentioned above, but with the benefit of a simple system, where clocks and seed values are not required.

The second and third modules may share a secret which has been uniquely assigned thereto for use in determining whether the third module is in proximity to the second module. The first and fourth modules may also share a secret which has been uniquely assigned thereto for use in generating and validating the passcode. Alternatively, the first, second, third and fourth modules may all share a secret which has been uniquely assigned thereto for use in determining whether the third module is in proximity to the second module and for generating and validating the passcode.

The various modules may be uniquely assigned a secret. Different secrets may be separately assigned to the two pairs of modules, i.e. the second and third modules, and the first and fourth modules; however in some cases, the same secret may be assigned to all four modules. Here, uniquely assigning a secret means that the secret is not available to any external system, for example on a remote server. By contrast, the secret may be assigned to, or built into, the modules during manufacture. This increases the security of the system, since no external system can be compromised to access the secret. Moreover, if the modules themselves are compromised, then only the secret or secrets assigned thereto are compromised and other, similar, modules associated with a different apparatus are not affected.

The third module may be arranged to generate a secure signal and to cause the secure signal to be wirelessly transmitted. The second module may be arranged to receive and validate a said secure signal whereby to detect whether the third module is in proximity to the second module. The second and third modules may be arranged to cooperate with wireless communications equipment whereby to cause the signal to be transmitted and to receive a said signal. The shared secret may be used for generating and validating the secure signal.

The first module may be arranged to be connected to a user interface, and to cause the passcode to be made available to a user via the user interface. The fourth module may be arranged to be connected to a further user interface, and to receive a passcode provided by a user to the further user interface. The first module may be arranged to limit the provision of the passcode to the user interface. The first module may be connected to other modules, for example to receive a seed value as described above. However, by limiting the provision of the passcode to the user interface, the apparatus can ensure that any attack on the system will not gain access to a generated passcode. In other words, the first module will only make the passcode available through the user interface. One method of doing this is to ensure that the first module comprises a secure element, and that the secure element has only a single output, that arranged to drive the user interface.

The first and fourth modules may be communicatively unconnected. By being communicatively unconnected, the passcode can only be transferred between the first and fourth modules via a user, thus ensuring a local user is present.

The apparatus may comprise: a first element comprising the second and fourth modules; a second element, communicatively unconnected to the first element, comprising the first module; and a third element, physically separate from the first element, comprising the third module. The first element may be arranged to enable access to the secure data. The second and third elements may be physically connected.

The apparatus may comprise: a first element comprising the fourth module; a second element, communicatively unconnected to the first element, comprising the first and second modules; and a third element, physically separate from the second element, comprising the third module. The first element may be arranged to enable access to the secure data. The first module may be arranged to generate the passcode in dependence on the second module detecting that the third module is in proximity to the second module.

The apparatus may comprise: a first element comprising the second and fourth modules; and a second element, physically separate from the first element, comprising the first and third modules. The first and third modules may be arranged within the second element such that the third module is prevented from receiving a generated passcode from the first module.

The apparatus may comprise: a first element comprising the third and fourth modules; and a second element, physically separate from the first element, comprising the first and second modules. The first and second modules may be arranged within the second element such that the second module is prevented from receiving a generated passcode from the first module.

The apparatus may comprise a memory arranged to store the secure data. Alternatively, at least a part of the apparatus may be arranged to be connected to a memory arranged to store the secure data. The secure data may comprise credentials for enabling access to a system remote from the apparatus. The secure data may comprise one or more of: at least one cryptographic key or shared secret; a public key certificate; at least one username; and at least one passcode.

According to a second aspect of the invention there is provided apparatus for enabling access to secure data, the apparatus comprising: at least one module arranged to provide a first security function based on a limited use passcode which is made available to a user of the apparatus, at least one further module arranged to provide a second security function based on proximity sensing; and wherein the apparatus is arranged to enable access to secure data in dependence on both the first and second security functions.

The at least one module may comprise a first module arranged to generate a limited use passcode and make the passcode available to a user of the apparatus. The at least one module may comprise a fourth module arranged to receive a passcode via user input from the user of the apparatus, and validate the passcode whereby to provide the first security function.

The at least one further module may comprise a second module arranged to detect a third module being in proximity to the second module. The at least one further module may comprise the said third module.

The second module may be configured to receive a seed value from the third module, the seed value having been used to generate the limited use passcode. The second module may be configured to receive a seed value from the third module, and to provide the seed value to the at least one module for use in generating the limited use passcode.

At least two of the modules share a secret which is uniquely assigned thereto for use in providing the security functions.

According to a third aspect of the invention there is provided apparatus for enabling access to secure data, the apparatus comprising: a first module; and a second module, wherein the first and second modules are arranged to communicate whereby to enable detection of the second module being in proximity to the first module, and the first and second modules share a secret which has been uniquely assigned thereto during manufacture of the modules for use in determining whether the second module is in proximity to the first module.

The two modules may be uniquely assigned a secret during manufacture. Here, uniquely assigning a secret means that the secret is not available to any external system, for example on a remote server. By contrast, the secret is assigned to, or built into, the modules during manufacture. This increases the security of the system, since no external system can be compromised to access the secret. Moreover, if the modules themselves are compromised, then only the secret or secrets assigned thereto are compromised and other, similar, modules associated with a different apparatus are not affected. It will be appreciated that the first and second modules described here correspond to the second and third modules described throughout the remainder of this document.

According to a fourth aspect of the invention there is provided a method for enabling access to secure data, the method comprising: generating a limited use passcode and making the passcode available to a user; communicating between a second module and a third module whereby to enable detection of the third module being in proximity to the second module; receiving a passcode via user input; and enabling access to secure data in dependence on receiving a valid passcode and the third module being in proximity to the second module.

A first module may generate the limited use passcode, and a fourth module may receive the passcode. The method may comprise: making a seed value concurrently available to the first and fourth modules by transferring the seed value between the second and third modules; using the seed value to generate the limited use passcode; and validating a received passcode using the seed value.

The first module and the third module may comprise synchronized clocks and the method may comprise determining the seed value using an indication of time from respective clocks. The first and third modules may be communicatively connected and the method may comprise cooperating between the first and third modules whereby to generate and have the seed value concurrently available. The second and fourth modules may be communicatively connected and the method may comprise providing, from the second module to the fourth module, the seed value received from the third module.

The third and fourth modules may be communicatively connected, the first and second modules may be communicatively connected, and the method may comprise: cooperating between the third and fourth modules whereby to generate and have the seed value concurrently available; and, providing, from the second module, the seed value received from the third module to the first module.

The third and fourth modules may be communicatively connected, the first and second modules may be communicatively connected, and the method may comprise: providing, from the fourth module to the third module, data indicative of the passcode received via user input; transferring, from the third module to the second module, data indicative of the received passcode; and determining whether the generated passcode made available to the user by the first module was received via user input at the fourth module.

The second and third modules may share a secret which has been uniquely assigned thereto for use in determining whether the third module is in proximity to the second module. The first and fourth modules may share a secret which has been uniquely assigned thereto for use in generating and validating the passcode. Alternatively, the first, second, third and fourth modules may share a secret which has been uniquely assigned thereto for use in determining whether the third module is in proximity to the second module and for generating and validating the passcode.

The method may comprise: generating a secure signal and causing the secure signal to be wirelessly transmitted; and receiving and validating a received secure signal whereby to detect whether the third module is in proximity to the second module. The second and third modules may be arranged to cooperate with wireless communications equipment whereby to cause the signal to be transmitted and to receive a said signal. The method may comprise using the shared secret for generating and validating the secure signal.

The first module may be arranged to be connected to a user interface, the fourth module may be arranged to be connected to a further user interface, and the method may comprise: causing the passcode to be made available to a user via the user interface; and receiving a passcode provided by a user to the further user interface. The method may comprise limiting the provision of the passcode to the user interface. The first and fourth modules may be communicatively unconnected.

A first element may comprise the second and fourth modules; a second element, communicatively unconnected to the first element, may comprise the first module; and a third element, physically separate from the first element, may comprise the third module. The method may comprise enabling access to the secure data at the first element. The second and third elements may be physically connected.

A first element may comprise the fourth module; a second element, communicatively unconnected to the first element, may comprise the first and second modules; and a third element, physically separate from the second element, may comprise the third module. The method may comprise enabling access to the secure data at the first element. The method may comprise generating the passcode in dependence on the detecting that the third module is in proximity to the second module.

A first element may comprise the second and fourth modules; and a second element, physically separate from the first element, may comprise the first and third modules. The method may comprise preventing the third module from receiving a generated passcode from the first module.

A first element may comprise third and fourth modules; and a second element, physically separate from the first element, may comprise the first and second modules. The method may comprise preventing the second module from receiving a generated passcode from the first module.

The method may comprise storing the secure data. The method may comprise connecting to a memory arranged to store the secure data. The secure data may comprise credentials for enabling access to a system remote from the method. The secure data may comprise one or more of: at least one cryptographic key or shared secret; a public key certificate; at least one username; and at least one passcode.

According to a fifth aspect of the invention, there is provided a method for enabling access to secure data, the method comprising: providing a first security function based on a limited use passcode which is made available to a user, providing a second security function based on proximity sensing; and enabling access to secure data in dependence on both the first and second security functions.

The method may comprise generating a limited use passcode and making the passcode available to a user. The method may comprise receiving a passcode via user input, and validating the passcode whereby to provide the first security function. The method may comprise detecting a third module being in proximity to a second module.

The method may comprise receiving a seed value, the seed value having been used to generate the limited use passcode. The method may comprise receiving a seed value, and providing the seed value for use in generating the limited use passcode. The method may comprise uniquely assigning a shared secret for use in providing the first and second security functions.

According to a sixth aspect of the invention, there is provided a method for enabling access to secure data, the method comprising: uniquely assigning a shared secret to a first and second module during manufacture of the modules; communicating between the first and second modules using the shared secret whereby to enable detection of the second module being in proximity to the first module.

According to further aspects of the invention, there is provided a computer program arranged to perform the methods described above.

Further features and advantages will become apparent from the following description of preferred embodiments, given by way of example only, which is made with reference to the accompanying drawings.

BRIEF DESCRIPTION OF THE DRAWINGS

Systems, apparatuses and methods will now be described as embodiments, by way of example only, with reference to the accompanying figures in which.

Some parts, components and/or steps of the embodiments appear in more than one Figure; for the sake of clarity the same reference numeral will be used to refer to the same part, component or step in all of the Figures.

DETAILED DESCRIPTION OF CERTAIN INVENTIVE EMBODIMENTS

Figure 1:
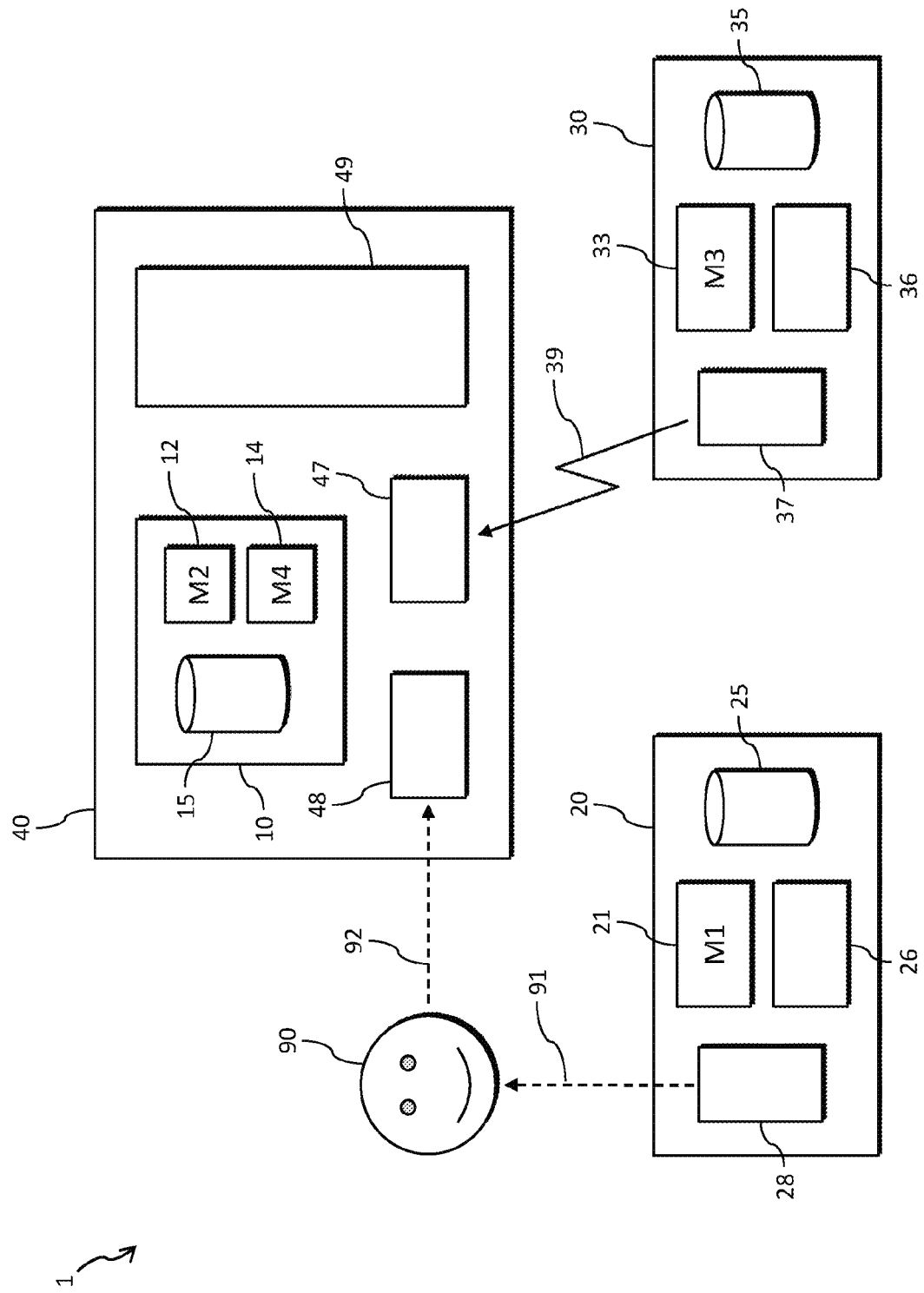
FIG. 1 shows a schematic diagram of an apparatus 1 according to an embodiment.

FIG. 1 shows a schematic diagram of an apparatus 1 for enabling access to secure data according to an embodiment. In general terms the apparatus comprises at least one module arranged to provide a first security function based on a limited use passcode which is made available to a user of the apparatus, and at least one further module arranged to provide a second security function based on proximity sensing. The apparatus enables access to secure data in dependence on both the first and second security functions.

In detail, according to this embodiment, the apparatus 1 comprises a device 40. The device 40 is provided with a first element 10, which itself comprises a second module 12 and a fourth module 14. The first element 10 may further comprise a memory 15, which may store secure data, one or more keys, as well as computer executable instructions. The second and/or fourth modules 12 and 14 may retrieve the computer instructions and the one or more keys from the memory 15, execute the computer instructions and use the one or more keys to enable access to the secure data. The device 40 may further comprise a user interface 48, wireless communications equipment 47; and further ancillary hardware and/or software 49 such as the device's main processor and memory.

By way of context, the device 40 may, for example, be a portable communications device, such as a mobile telephone, tablet computer or laptop computer and the first element 10 may be a Subscriber Identity Module (SIM) within the mobile phone.

The apparatus in this embodiment comprises a second element 20 which may be communicatively unconnected to the first element 10 (and thus from the second and fourth modules 12 and 14). The second element 20 comprises a first module 21. The second element 20 may further comprise a memory 25, a clock 26 and a user interface 28. The memory 25, as with memory 15, may store computer executable instructions and one or more keys for execution and use respectively by the first module 21. The first module 21 may also receive an indication of time from the clock 26.

The apparatus in this embodiment comprises a third element 30, which may be physically separate from the first element 10 and comprising a third module 33. The third element may comprise a memory 35, a clock 36 and wireless communications equipment 37. Again, as with memory 15, the memory 35 may store computer executable instructions and one or more keys to be executed and used respectively by the third module 33. Similarly the third module 33 may receive an indication of time from the clock 36.

The clocks 26 and 36 of the second and third modules may be synchronized clocks. The output of one of the clocks may be determined using the output of the other of the clocks, or the clocks may be synchronized using some other mechanism, for example with reference to a third time source.

To continue the example above, to put the second and third elements 20 and 30 into context, the second and third modules may be small, self-contained devices, often termed fobs or dongles. These self-contained devices may be adapted to fit on a keychain, for example.

In use, access may be requested, via the device 40, to secure data stored in memory 15. This access may be requested through the ancillary hardware/software 49—which may be taken to represent, for example, the main processor and operating system of device 40. The access may be requested in response to user interactions with the device 40. A request for access to the secure data may trigger the process described below, however any other event may trigger the process.

In this embodiment, in response to a trigger, the second and third modules 12 and 33 communicate to provide a security function based on proximity sensing. In detail, the third module 33 of the third element 30 generates a secure signal and cooperates with wireless communications equipment 37 to cause the secure signal to be wirelessly transmitted, as shown by arrow 39. The second module 12 cooperates with wireless communications equipment 47 of the device 40 to receive the signal. The second module 12 then validates the received signal as being generated by the third module 33. The signal may be generated and validated using the one or more keys stored in the memories 15 and 35. This transmitting and receiving of the signal performs a proximity sensing function. That is, it enables the second module 12 to identify the third module 33, and to detect whether the third module 33 is in proximity to the second module 12. It will be appreciated that proximity as described here is physical proximity.

While not shown, the communication between the second and third modules 12 and 33 may be two way communications. For example, the second module 12 may transmit a signal, such as a challenge code, to the third module 33 via the mobile communications equipment 47 and 37. The third module 33 may then respond to this challenge code, for example by signing the challenge code using the one or more keys stored in memory 35 and a known cryptographic function.

In this embodiment, the first and fourth modules 21 and 14 may provide a security function based on a limited use passcode which is made available to a user of the apparatus. In detail, the first module 21 generates a limited use passcode. This may be done using the one or more keys stored in memory 25, and a seed value, which may be, for example, an indication of time from the clock 26. The passcode is limited use in that there is a limit on its validity. For example, the passcode may only be used once (after which it becomes invalid). Alternatively or additionally, the passcode may be valid for a limited duration. One example of a limited use passcode is a "one-time passcode" or OTP. It will be appreciated that a passcode is equivalent to a password, and that passcode or password may be used interchangeably. One advantage of using a generated, limited use, passcode is that the opportunities for replay attacks, where the passcode is stored and then used by an unauthorized party at a later time, are reduced or eliminated. The use of an indication of time from a clock as a seed value ensures that a different passcode is generated at different points in time. It will be apparent that a fixed passcode can be stored and later used by an unauthorized party in a replay attack, and therefore the entry of a fixed passcode cannot be taken as indicative of a user being present.

The first module is connected to the user interface 28, and causes the passcode to be made available to a user 90 via the user interface 28, as shown by dashed arrow 91. One method of providing the passcode to the user 90 is to output the passcode on a display device. As such, the user interface 28 may comprise a display device. However, this is not the only method, and audio, tactile (e.g. Braille) or any other form of output may be used to provide the passcode to the user 90.

The user subsequently provides the passcode as user input to the user interface 48 of the device 40, as represented by dashed arrow 92. To enable the passcode to be entered, the user interface 48 may comprise buttons, a keypad or a touchscreen; however any other suitable user interface may be used, for example a voice entry interface.

The fourth module 14 is connected to the user interface 48 and therefore is able to receive the passcode provided by the user 90 to the user interface 48. The fourth module 14, having received the passcode via user input 92, validates the passcode as being generated by the first module 21. This validation of the passcode may be done using an indication of time as a seed value and the one or more keys from the memory 15.

To use an indication of time as a seed value, the fourth module preferably has access to a trusted source of time. Here, a trusted source of time is one which can be relied upon to be unaltered. By way of example, time determined by a secure clock, internal to the module, can be trusted, whereas time provided by a user input cannot be trusted. Relying on a source of time which can be altered may enable replay attacks, where the time available to one modules is altered. This may make the fourth module accept a passcode generated in the past, or make the first module generate a passcode which will be valid in the future.

The fourth module may not have access to a trusted source of time. This may be because, due to manufacturing considerations, the relevant module cannot be provided with an internal clock. For example, a Subscriber Identity Module (SIM) of a mobile telephone does not have a trusted internal clock as it has no continuous source of power (the clock will stop if the SIM is removed, or the telephone switched off).

In this embodiment, a seed value may be determined by the third module 33 using an indication of time from clock 36. This seed value may then be provided by the third module 33 to the second module 12 in signal 39—i.e. as part of the proximity sensing security function. As the clock 36 is internal to the third element 30, it may be considered a trusted source of time. It may be possible to construct the third element 30 with a clock as it may not be subject to the same manufacturing limitations as the first element 10. For example, a self-contained keychain fob may be used as a third element containing the third module. The keychain fob may be provided with an internal battery, and have a clock which will maintain time wherever the keychain fob is located. By contrast, a SIM typically does not contain a battery, and therefore may not contain a clock which will operate when the SIM is disconnected from a portable device.

The seed value provided by the third module 33 can further be trusted by the fourth module 14. This is because the seed value is provided in a secure manner from the third module 33 to the second module 12—for example it may be signed and/or encrypted and decrypted and/or verified using the one or more keys in memories 35 and 15. Moreover, since the second and fourth modules 12 and 14 are communicatively connected, the seed value can be securely provided from the second module 12 to the fourth module 14. Thus the fourth module 14 is able to validate the limited use passcode received as user input 92 without requiring separate access to a trusted source of time or other source of a seed value. In effect, the second and third modules 12 and 33 can be provided with a secondary use—that of enabling the seed value to be available to the fourth module 14.

The apparatus may subsequently enable access to the secure data in dependence on both the fourth module 14 validating a received passcode and the second module 12 detecting that the third module 33 is in proximity to the second module 12. In this embodiment, this enabling may be performed by one or both of the second and modules 12 and 14.

It will be apparent that the at least one module arranged to provide a first security function based on a limited use passcode which is made available to a user of the apparatus, may comprise the first and fourth modules 21 and 14. The at least one further module arranged to provide a second security function based on proximity sensing may comprise the second and third modules 12 and 31.

Therefore, embodiments are able to enable access to the data to situations when a local user is present, so as to be able to provide the user input 92, and when the correct proximity device, i.e. third element 30, is in proximity. This has the effect of ensuring that first the device 40 has not been compromised and accessed by an unauthorized user (for example a remote user, who has remotely access the device), as this unauthorized user would not be able to provide the user input 92; and second that the device is in proximity to the third element 30 meaning that the device is in proximity to an authorized user, and therefore is unlikely to have been lost or stolen.

To improve security, the first module 21 may limit the provision of the passcode to the user interface 28. For example the first module 21 may be prevented from providing any output, other than the passcode to the user interface 28. Alternatively the first module 21 may be configured that the passcode, as an output, can only be provided to the user interface 28, and not to any other circuitry which may be connected directly or indirectly to the first module 21. In some embodiments, the first and fourth modules 21 and 14 may be communicatively unconnected.

Each of the modules described above had access to one or more cryptographic keys. These keys may be considered to be one or more shared secrets. In particular embodiments, the shared secrets may be uniquely assigned to a given pair of modules. For example, the second and third modules may share a secret which has been uniquely assigned thereto; alternatively or additionally, the first and fourth modules may share a secret which has been uniquely assigned thereto. In some embodiments, the first, second, third and fourth modules all share a secret which has been uniquely assigned thereto. The shared secret or secrets may be used to generate and validate the passcode, and to generate and validate any secure signals sent between wireless communications equipment 37 and 47.

Here, the secret being uniquely assigned may include an arrangement in which the secret is not available to any other device or system. For instance, the secret may be unavailable on a remote server. This presents three advantages, firstly the modules operate as described above without needing to contact a remote server or the like. Secondly, there is no remote server which can be compromised to obtain the shared secrets (i.e. the keys), thus increasing the security of the apparatus. Thirdly, if a given apparatus is compromised, then other, similar, apparatuses (in a larger system of many apparatuses) remain unaffected, as any keys and secure data are local to, and thus limited to, the given apparatus. The modules may be provided with the shared secret upon manufacture, meaning the modules are sold as a set, each module already storing the keys required to communicate with the others modules within the set. This means that there is no requirement to initialize the apparatus by installing keys.

While the second and third elements 20 and 30 have been shown as separate entities, in embodiments these two elements may be physically connected, without being communicatively connected. That is, they form part of the same device, but are functionally separate. In such embodiments, the elements may share, for example, a battery or other power supply. Alternatively, the second element 20 may be physically connected to the device 40, and may likewise share a power supply with the device 40.

FIGS. 2, 3a, 3b and 3c show apparatus 2 for enabling access to secure data according to further embodiments. These embodiments share many features with the embodiment described above in FIG. 1, which will be given the same reference numerals. Equally, many of the functions of these embodiments will be the same as described above, and therefore will not be described again in detail. The apparatus 2, like the apparatus 1, comprises at least one module arranged to provide a first security function based on a limited use passcode which is made available to a user of the apparatus, and at least one further module arranged to provide a second security function based on proximity sensing. The apparatus enables access to secure data in dependence on both the first and second security functions.

Figure 2:
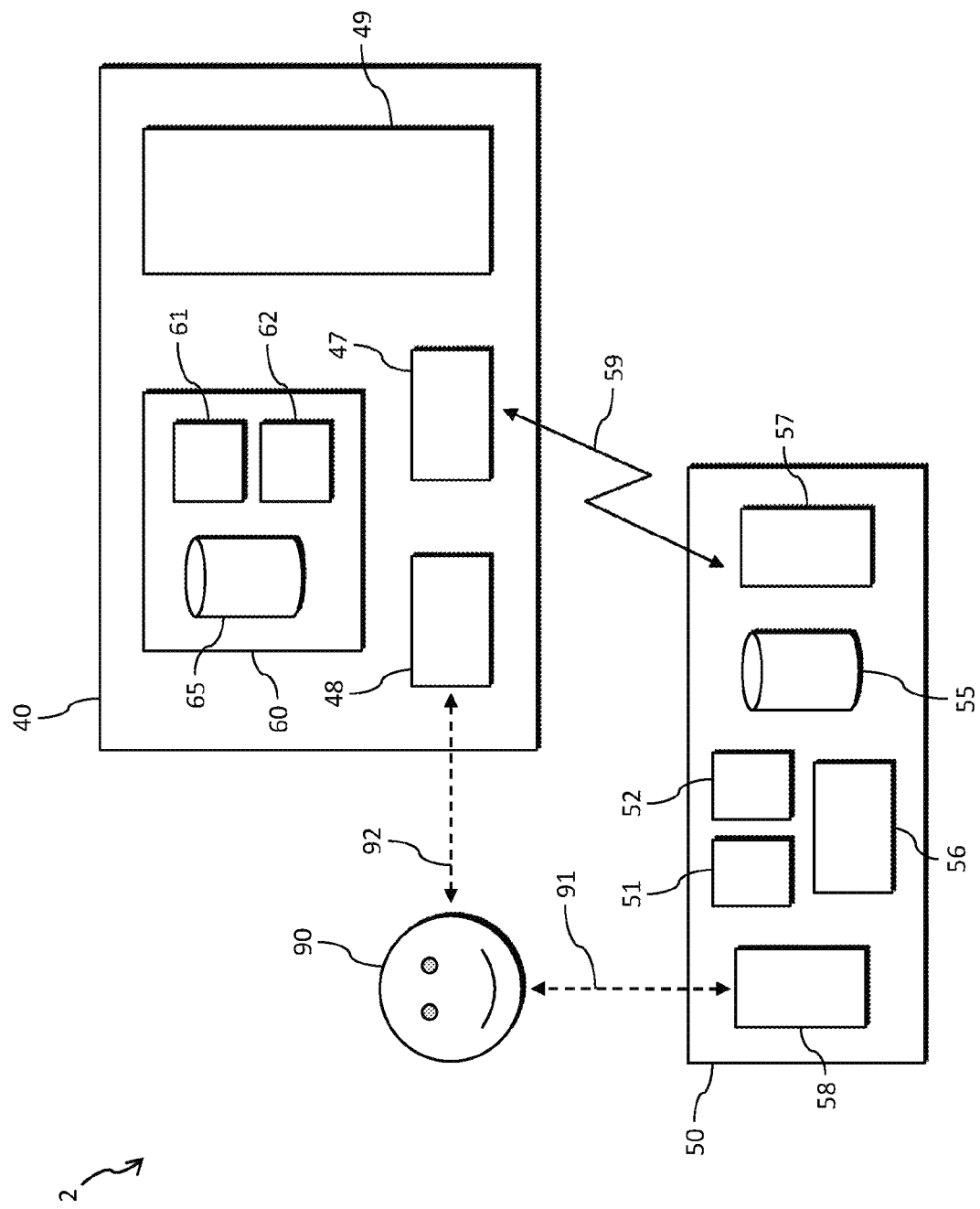
FIG. 2 shows a schematic diagram of an apparatus 2 according to a further embodiment.
Figure 3B:
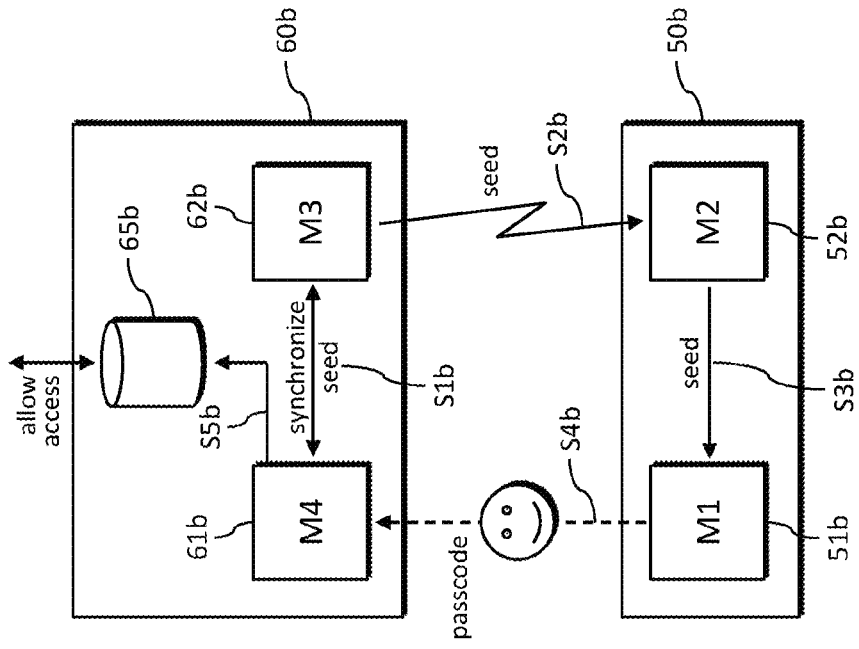
FIGS. 3a, 3b and 3c show the arrangement of modules and data flows in apparatus 2 according to various embodiments.
Figure 3A:
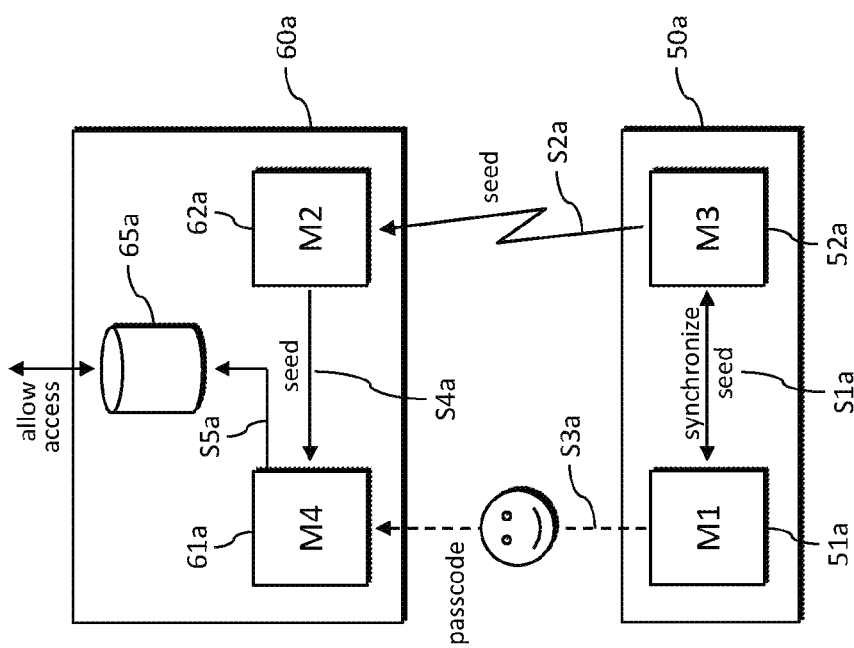
Figure 3C:
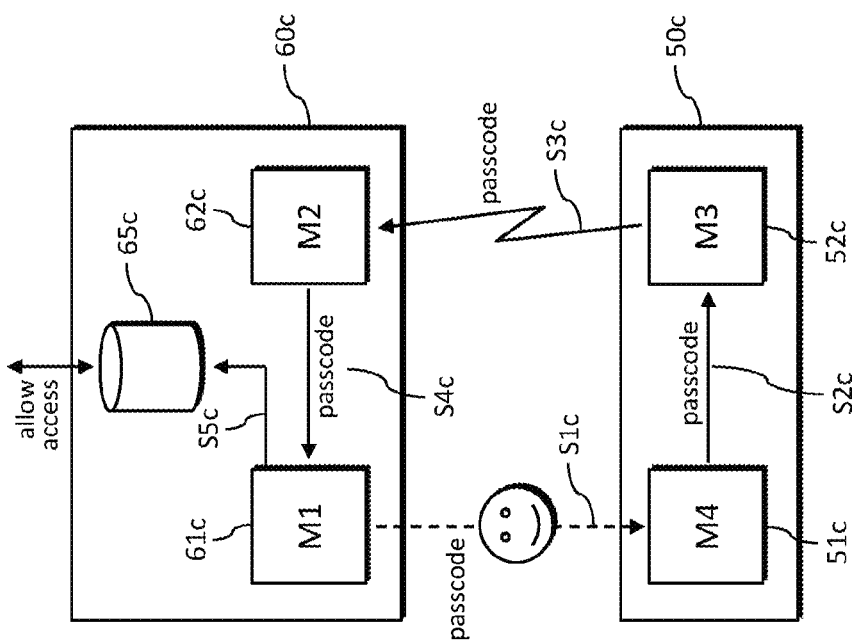

The embodiments which will now be described differ in two aspects from the embodiment described in FIG. 1. First, the second and third elements 20 and 30 have been combined into a single element 50. Second, while the modules will still be referred to as the first to fourth modules, and will have the same functionality as described above, the choice of which modules are within which element may be different. For example, in one embodiment below, the third and fourth modules are present within a first element 60, in contrast to the embodiment above, where the second and third modules 12 and 14 were present within first element 10. FIG. 2 shows a generalized view of the apparatus 2, while FIGS. 3A, 3B and 3C show variations according to embodiments.

Referring to FIG. 2, a device 40 comprises a user interface 48, wireless communications equipment 47, and further ancillary hardware and/or software 49 such as the device's main processor and memory. The device 40 also comprises a first element 60, which itself comprises two modules 61 and 62 and a memory 65, which may store secure data, one or more keys, as well as computer executable instructions.

The apparatus 2 further comprises a second element 50 which is physically unconnected to the first element 60. This is effectively a combination of the second and third elements described above in FIG. 1, where similar elements, such as a clock, have been combined. As such, the second element 50 comprises two modules 51 and 52, a memory 55, clock 56, wireless communications equipment 57 and user interface 58.

Where a single element comprises more than one module, it will be apparent that the modules are communicatively connected and will be able to, at least, communicate to provide information to, or receive information from, the other of the modules within the element.

In use, information is transferred (possibly via the user) between the modules 51 and 52 in the second element 50 and the modules 61 and 62 in the first element 60. These transfers are represented as arrow 59, representing the wireless, proximity sensing, communications, and arrows 91 and 92 representing the provision of a passcode to a user 90, and the user 90 providing the passcode as user input. The arrows 59, 91 and 92 are all double-headed, as the communications may be either or both ways, depending on the embodiment. The detail of the information transfer will be described below.

FIGS. 3A, 3B and 3C show variations of the arrangement of modules within the elements. A description of how these arrangements enable these modules operate to provide a first security function based on a limited use passcode which is made available to a user of the apparatus, and a second security function based on proximity sensing will be provided with reference to these figures. For clarity, within these figures, the features other than the modules 51, 52, 61 and 62, elements 50 and 60, and memory 65 have been omitted.

FIG. 3A shows a first arrangement of the modules within the first and second elements 60 and 50. The first element 60a, from within device 40, is given reference 60a. The first element comprises second and fourth modules 62a and 61a, and memory 65a. The second element is given reference 50a, and comprises first and third modules 51a and 52a.

The embodiment shown in FIG. 3A illustrates an embodiment in which the first and third modules 51a and 52a, located within the second element 50a, provide both a passcode and a seed to the first element 50a. This embodiment is, in effect, an adaptation of the embodiment of FIG. 1, where the first and third modules 51a and 52a are located within the same element. However, in this embodiment, the first and third modules 51a and 52a are communicatively connected.

In use, in step S1a, the first and third modules 51a and 52a cooperate to generate and have a seed value concurrently available. The seed value may take many forms, for example being the value of a counter (incrementing, for example, every time a passcode is generated), an indication of time, or a randomized number. The cooperation between the first and third modules 51a and 52a may be done in a number of ways, for example: the first module 51a may generate the seed value, and provide the seed value to the third module 52a; the third module 52a may generate the seed value, and provide the seed value to the first module 51a; a further module, not shown, may generate the seed value and provide the seed value to both the first and third modules 51a and 52a; and/or both of the first and third modules 51a and 52a may receive an indication of time from clock 56 (shown in FIG. 2, omitted from FIG. 3a), and may use this indication of time directly as the seed value, or calculate the seed value from the indication of time (in this last example the two modules may comprise, or be connected to, a single clock, or different synchronized clocks).

Following step S1a, the third module 52a provides the seed value to the second module 62a as illustrated by step S2a. This step also provides the proximity sensing function, i.e. sensing that the third module 52a (and thus the second element 50a) is in proximity to the second module 62a (and thus the first element 60a).

The first module 51a uses the seed value mentioned in step S1a to generate a limited use passcode which, in step S3a, is provided to a user, and thus is provided as user input to the fourth module 61a. In addition, the second module 62a, having received the seed value from the third module 52a in step S2a, provides the seed value to the fourth module 61a in step S4a.

The fourth module 61a has therefore received the seed value and the received passcode. Consequently, the fourth module uses the seed value to validate the received passcode. If the passcode is validated, and since the receipt of the seed may be taken as in indication of proximity, the fourth module 61a may allow access to the secure data in memory 65a as represented by step S5a. It will be appreciated that the fourth module 61a may not be solely involved in enabling access to the secure data, and thus the first element 60a in general may be configured to enable access to the secure data.

An alternative embodiment is shown in FIG. 3B. In this embodiment the first element 60b comprises the fourth and third modules 61b and 62b and memory 65b. The second element 50b comprises the first and second modules 51b and 52b. As with the embodiment in FIG. 3a, the pairs of modules within a given element are communicatively connected.

In a step S1b, the third and fourth modules 61b and 62b cooperate whereby to generate and have a seed value concurrently available. This may be done using any of the methods described above in relation to the first and third modules 51a and 52a of FIG. 3A.

In step S2b, the third module 62b provides the seed value to the second module 52b as part of the proximity sensing function. The second module 52b then provides the seed value received from the third module 62b to the first module 51b in step S3b.

The first module 51b, having received the seed value in step S3b, generates a passcode using the seed value. This passcode is then provided to the user and, as shown by step S4b, is provided as user input from the user to the fourth module 61b.

The fourth module 61b, which already has access to the seed value (having generated or received it in step S1b) is able to validated the received passcode, and based on the validation allow access to the secure data from memory 65*b* as shown by step S5*b*.

Another embodiment is shown in FIG. 3C. This embodiment contrasts with the above embodiments in that the first element 60*c* comprises the first and second modules 61*c* and 62*c*, as well as the memory 65*c*. Accordingly, the second element 50*c* comprises the fourth and third modules 51*c* and 52*c*. As the first element 60*c* (which stores the data in memory 65*c*) is the element which provides the passcode, this embodiment is suited to situations where the data is stored in an element which has limited capability for a user interface. For example, a small element, such as one contained in a fob or smartcard may have a display (for displaying a passcode to a user) but may not have a keypad or the like which would be required to provide a passcode as user input.

In use, a passcode is generated by the first module 61*c*. A seed value may be used to generate the passcode, however the passcode may simply be a random number or the like.

The passcode is provided to the user, and from the user, as user input S1*c*, to the fourth module 51*c*. The fourth module 51*c* provides the passcode to the third module 52*c* in step S2*c*. The third module then transmits the passcode to the second module 62*c* as part of a proximity sensing process. Finally, the passcode is provided from the second module 62*c* to the first module 61*c* in step S4*c*. This enables the first module 61*c* to determine whether the generated passcode was the same as the one returned to it. If the passcode is the same, then the first module 61*c* may allow access to the data from the memory 65*c*, as represented by step S5*c*. It will be appreciated that the user input passcode may not itself be communicated from the fourth module back to the first module; that is, steps S2*c*, S3*c* and S4*c* may not involve transfer of the passcode. Instead, a representation of the passcode, for example an encrypted or hashed version may be transferred. Alternatively, the passcode received by the fourth module may be used to set up a secure session between the second and third modules 62*c* and 52*c*.

Figure 4:
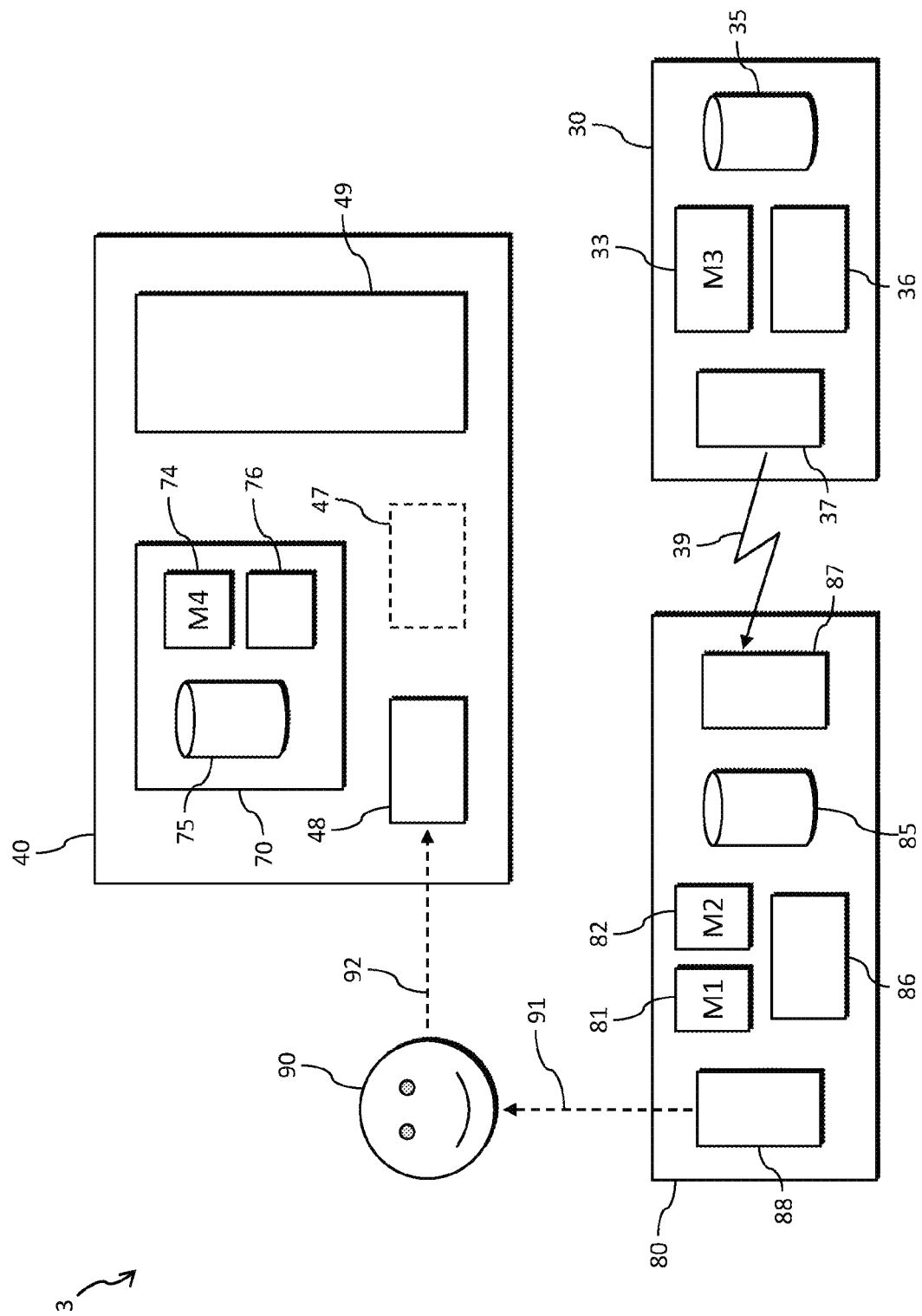
FIG. 4 shows a schematic diagram of an apparatus 3 according to another embodiment.

An apparatus 3 according to an alternative embodiment will now be described with reference to FIG. 4. This embodiment is similar to the first embodiment shown in FIG. 1; however, in this embodiment, while the passcode is generated by a module within a second element 80 and provided to a first element 70, the proximity sensing function operates between the second element 80 and a third element 30.

The apparatus 3 comprises a device 40. Device 40, is similar to device 40 described above, and comprises a first element 70, a user interface 48 and ancillary hardware and/or software 49 such as the device's main processor and memory. The device 40 does not require wireless communications equipment 47, hence this feature is shown with a dotted line.

The first element 70 comprises a fourth module 74 and a memory 75, which may store secure data, one or more keys, as well as computer executable instructions. The fourth module 74 may retrieve the computer instructions and the one or more keys from the memory 75, execute the instructions, and use the one or more keys to enable access to the secure data. The first element 70 may also comprise clock 76.

The apparatus 3 further comprises a second element 80. This second element 80 comprises first and second modules 81 and 82, a memory 85, clock 86, wireless communications equipment 87 and user interface 88. The second element is similar to the second element 50 described above.

The apparatus 3 comprises a third element 30, physically separate from the second element 80 and comprising a third module 33. The third element may comprise a memory 35, a clock 36 and wireless communications equipment 37. The third element 30 described here may be the same as the third element 30 described above.

In use, the third module 33 of the third element 30 communicates with the second module 82 of the second element 80 to provide a proximity sensing function. Based on the detection of the third module being in proximity to the second module, the second module causes the first module 81 to generate a limited use passcode—that is the passcode is generated in dependence on the third module being in proximity to the second module. Both the sensing and the generating of the passcode may be performed substantially as described above, and will not be described in detail here. In some embodiments, the clock 86 of the second element may be omitted, and a seed value, for example time, may be received from the third module 30.

The passcode is then made available to the user 90 via the user interface 88. The user in turn provides the passcode as user input to the user interface 48 of the device 40 and thereby to the fourth module 74. The fourth module 74 may therefore validate the passcode and allow access to the data based on the passcode being valid. To validate the passcode, the fourth module 74 may use an indication of time from the clock 76. The receipt by the fourth module 74 of a valid the passcode may be taken as indicative that the proximity sensing security function has been satisfied, and therefore a valid passcode completes the two security functions, proximity and passcode.

Additional Details and Modifications

In embodiments, the secure data may comprise credentials for enabling access to a system remote from the apparatus 1. Such credentials may include encryption keys, usernames, passwords or passcodes, digital certificates and the like.

The first, second, third and fourth modules have been described separately. However, it will be apparent that this is for clarity, and where a single element (such as second element 50) comprises more than one module (such as modules 51 and 52) these modules may be provided as a single physical unit. In other words, the description of different modules is to be taken as an indication of different functional capabilities which may be provided to a given element, and not that separate hardware and/or software is required. Furthermore, the memories and clocks have been described separately within any given element—however these may be incorporated within any or each module as required.

Any module, or combination of modules, within an element may be embodied by a processing system, memory, software and hardware as known in the art to be able to achieve the desired functionality. Equally, the modules and/or the elements may be tamper resistant. That is they may be embodied by or within so called secure elements.

A single module (typically the fourth module) has been described as allowing access. This is not a requirement, and as a result of the operations described above, any module, whether illustrated or an additional, unillustrated, module may enable access to the secure data.

In the embodiments described above, the first element, within the device 40, lacks a clock. However this is not a requirement, and a suitable clock may be provided within the first element as required.

In some embodiments, a plurality of one or more of the first, second, third and fourth modules may be provided in a given apparatus. Different modules may therefore serve to identify different users, or different accounts for the same user. For example, in an embodiment similar to that shown in FIG. 3A, a single first element 60a may be provided along with a plurality of second elements 50a. The fourth and second modules 61a and 62a in the first element 60a may store keys or shared secrets corresponding to all of the plurality of the second elements 50a—as such, the keys or shared secrets may still be uniquely provided to the apparatus as a whole. Similar arrangements will be possible for the other embodiments described above.

In some embodiments, various elements may be activated by a physical act by a user. For example, the user may press a button to cause a passcode to be generated. In some embodiments, the proximity sensing functionality may serve to activate a device. For example, the embodiments illustrated by FIGS. 3A and 3B may be triggered by the act of bringing one element into close proximity to the other—sensed by the proximity functionality. During the proximity sensing security functionality, the current seed value may be transferred, and receipt, or transmission of the seed value may cause the first module to generate a passcode.

In the embodiments described above, the first element has been shown as a part of the device 40. However in further embodiments, the device 40 may be distributed, that is various elements of the device 40 may be provided in separate physical units, which are arranged to be connected. For example, the first element and the wireless communications equipment may be provided in an add-on case for a mobile telephone. The case can be connected to the mobile telephone. When connected, the first element within the case is capable of communicating with the mobile telephone, which provides the user interface, and ancillary hardware and software.

The proximity sensing security functionality, and equally the transfer of the seed value may be performed by any known wireless system. For example Near Field Communications (NFC), Radio Frequency ID (RFID), Bluetooth™, WiFi™ (802.11) or other short-range wireless communications systems. In alternative embodiments, the proximity sensing may be provided by a non-radio-frequency system; for example, direct coupling via contacts, inductive or capacitive coupling, audio or ultrasonic communication, mechanical coupling, including the use of vibrations such as Piezo vibrators, and visual or infrared (IR) communications, including the use of barcodes or QR codes displayed on a screen. Alternative method of providing a proximity sensing function, and for the transfer of data if applicable, will be apparent to the skilled person.

Likewise the communications between the second and third modules, and in particular communications arranged to ensure security may be enabled using known methods, such as the use of two-way communications involving a challenge code and challenge response, or one way communications using a rolling code (such as is used for unlocking a vehicle).

The ancillary hardware and/or software 49 of the device may be considered to cover features of the device which are not explicitly described above. For example, a typical mobile telephone will have a central processing system, memory, graphics processing system, various network interfaces (cellular, WiFi etc.) and the like. Thus the device 40, in general, will be recognized as being able to perform in a manner such that a user may request access to secure data—for example by selecting an option on a screen, or selecting and activating an application. Therefore, a request for secure data may be received from or via the ancillary hardware and/or software 49.

The seed values described above may be randomly generated numbers, or an indication of time. Where time is used, it will be apparent that this does not need to be a human recognizable time. As such, the synchronized clocks described above may simply be counters, started at the same time and with the same value, and configured to increment at a fixed interval.

The limited use passcode has been described as having a limited validity period. The nature of the limited use passcode may be selected based on the security level desired. For example, the first module and clock may be arranged such that the passcode changes after a predetermined period. To enable this, the seed value may be a counter, providing an indication of time, which increments every minute. It will be appreciated that an indication of time does not need to correspond to a human readable time, such as universal time, and that the indication of time may simply be a counter value, incrementing every period—in such cases, the clocks may be synchronized by setting the counters to the same value at a particular time. The period, after which the passcode changes, may be for example 1 minute, however, other periods, from seconds to hours are envisaged for the period.

To ensure that, for example, drift in synchronized clocks or variations in internal counters do not render the system inoperative, the fourth module may accept a range of passcodes. For example, where the seed value is time, the fourth module may accept any of three passcodes corresponding to the current, previous and next time periods (i.e. T, T+1 and T−1 where T is an indication of time which increments by 1 each period). This may mean that, in the example above, the passcode will have a validity between 2 and 3 minutes, depending on when in a given period it is provided to and by the user.

Alternatively, the seed value may be derived from a counter, which increments each time a password is generated (for example in a rolling code system). In such a system, the fourth module may accept passcodes corresponding to the next N values of the counter, where N may be a predetermined value ranging from 2 to many thousand. It will be appreciated that the selection of what range of passcodes to accept may be selected based on the balance between user convenience and security, since an attacker may generate passcodes in advance in an attempt at circumventing the system, and having a large value for N provides an attacker with greater opportunities for attack. The counters may be synchronized when a valid password is received, such that the counter value in the fourth module corresponds to the counter value used to generate the passcode in the first module.

While the above has been described in terms of a series of modules, performing certain steps, it will be appreciated that embodiments may be practiced by any suitably configured apparatus of system. In particular, in some embodiments there may be provided apparatus comprising at least one processor and at least one memory including computer program instructions, where the at least one memory and the computer program instructions are configured to, with the at least one processor, cause the apparatus at least to perform one or more of steps described above. In other embodiments, there may be provided a computer program product comprising a non-transitory computer-readable storage medium having computer readable instructions stored thereon, the computer readable instructions being executable by a computerized device to cause the computerized device to perform one or more of the steps above.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

What is claimed is:

1. An apparatus for enabling access to secure data, the apparatus comprising:
    a first module arranged to generate a limited use passcode and make the limited use passcode available to a user;
    a second module and a third module arranged to communicate whereby to enable detection of the third module being in proximity to the second module,
    wherein the second module is arranged to cause the first module to generate the limited use passcode in response to detection by the second module that the second module is wirelessly proximate to the third module; and
    a fourth module arranged to receive the limited use passcode via user input;
    wherein the apparatus is arranged to enable access to secure data in dependence on the fourth module receiving the limited use passcode generated by the first module,
    the apparatus further comprising:
    a first device comprising the fourth module;
    a second device, communicatively unconnected to the first device, comprising the first and second modules; and
    a third device, physically separate from the second device, comprising the third module.

2. The apparatus of claim 1, wherein the third module is arranged to generate a secure signal and to cause the secure signal to be wirelessly transmitted, and the second module is arranged to receive and validate a said secure signal whereby to detect whether the third module is in proximity to the second module.

3. The apparatus of claim 2, wherein the second and third modules are arranged to cooperate with wireless communications equipment whereby to cause the secure signal to be transmitted and to receive the secure signal.

4. The apparatus of claim 1, wherein the first and fourth modules are communicatively unconnected.

5. A method for enabling access to secure data, the method comprising:
    detecting, by a second module, that a third module in a third device is wirelessly proximate to the second module, wherein the second module causes a first module to generate a limited use passcode in response to the detecting the second module that the second module is wirelessly proximate to the third module, wherein the second module and the first module are in a second device that is physically separate from the third device;
    receiving, by a fourth module in a first device, the limited use passcode via user input; and
    in response to receipt of the limited use passcode by the fourth module in the first device, enabling access to secure data in dependence on receiving the limited use passcode.

6. The method of claim 5, comprising:
    generating a secure signal and causing the secure signal to be wirelessly transmitted; and
    receiving and validating a received secure signal whereby to detect whether the third module is in proximity to the second module.

7. The method of claim 6, wherein the second and third modules are arranged to cooperate with wireless communications equipment to cause the secure signal to be transmitted and received.

8. The method of claim 5, wherein the secure data comprises one or more of: at least one cryptographic key or shared secret; a public key certificate; at least one username; and at least one passcode.

9. The apparatus of claim 1, wherein the limited use passcode is a one time use passcode.

10. The apparatus of claim 1, wherein the second device comprises a user interface.

11. The apparatus of claim 10, wherein the second device further comprises wireless communication equipment.

12. The apparatus of claim 1, wherein the second device comprises a clock and a user interface.

* * * * *